July 12, 1966     KAZUO YASUNAMI     3,259,941
VERY HIGH PRESSURE APPARATUS
Filed Jan. 6, 1965     5 Sheets-Sheet 1
Fig- 1-
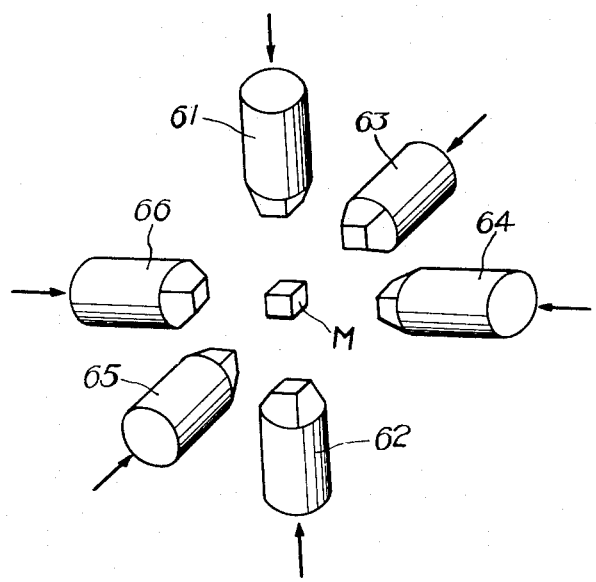
Fig- 2-
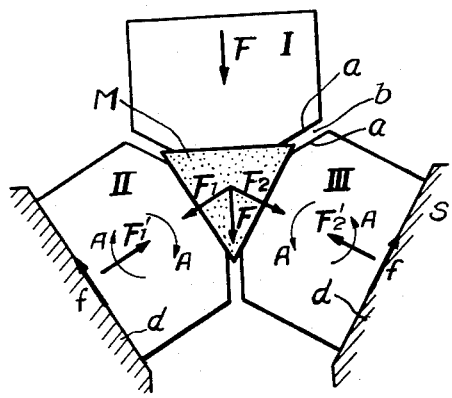
Fig- 3-
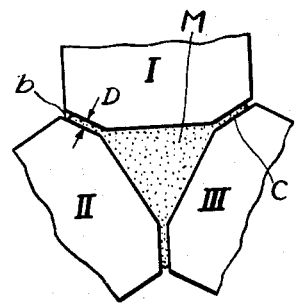
INVENTOR.
KAZUO YASUNAMI
BY Oldham & Oldham
ATTYS.

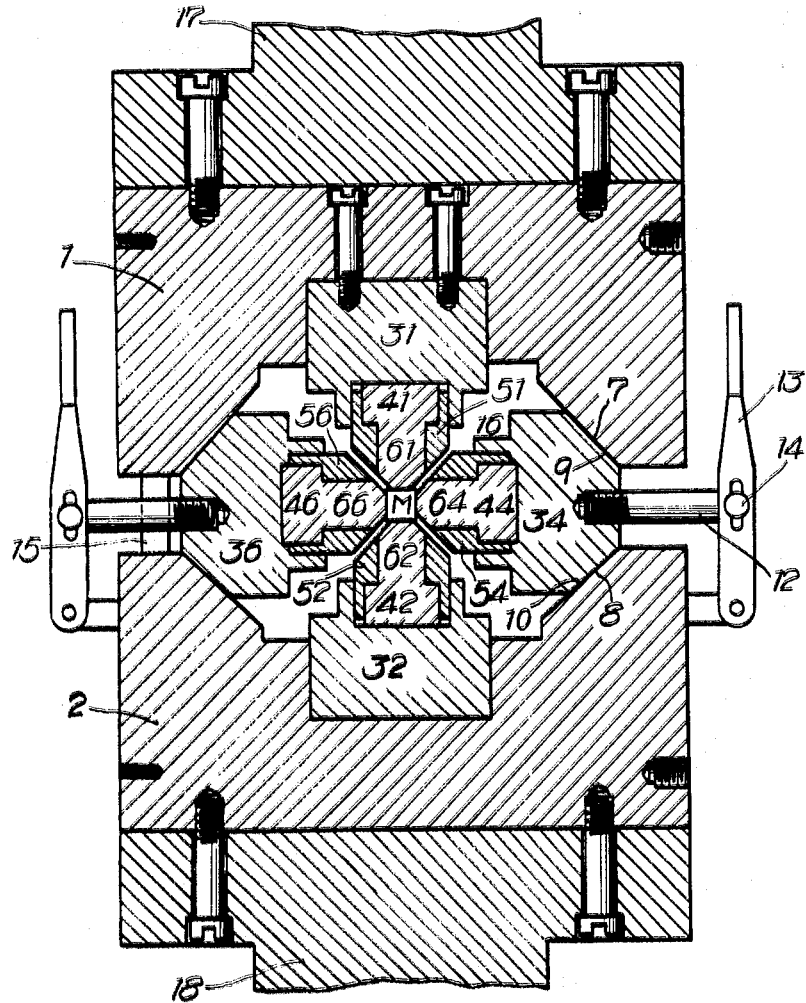

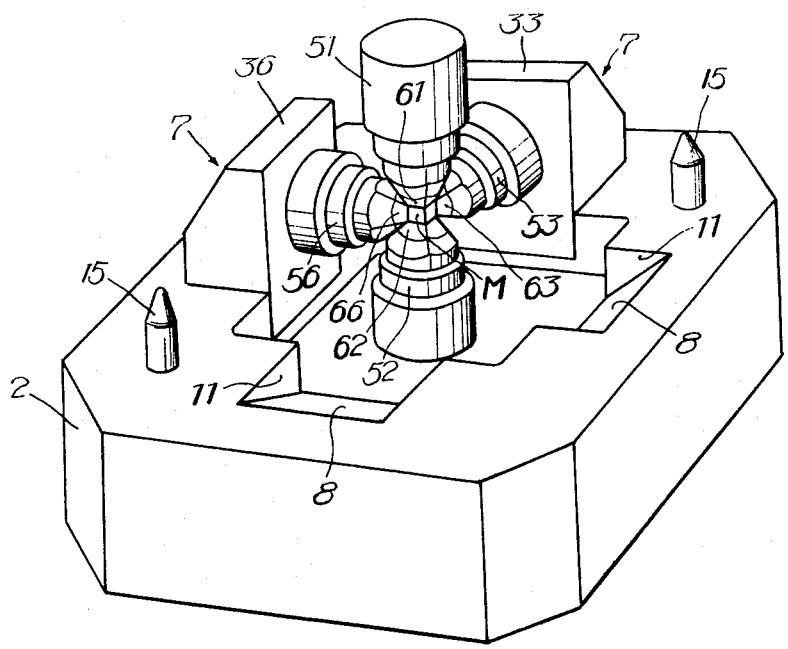

July 12, 1966  KAZUO YASUNAMI  3,259,941
VERY HIGH PRESSURE APPARATUS
Filed Jan. 6, 1965
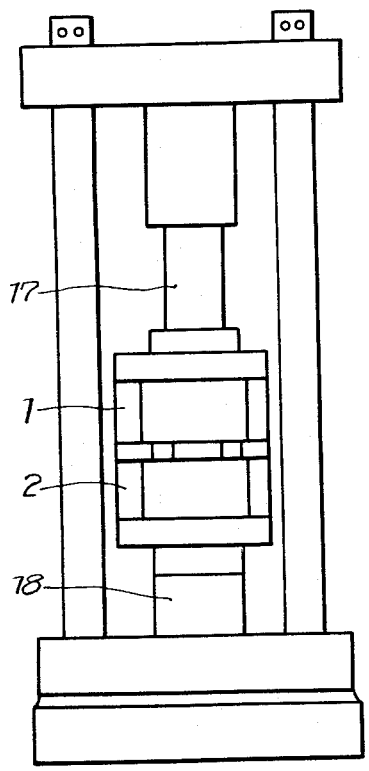
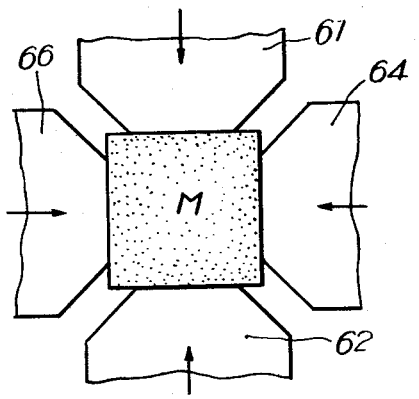
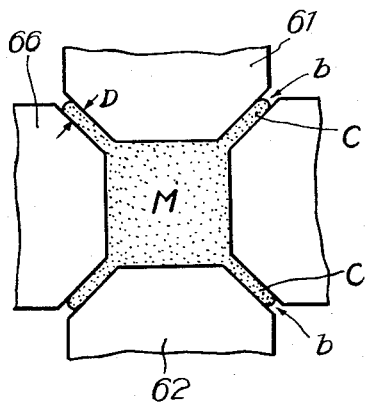
INVENTOR.
KAZUO YASUNAMI

United States Patent Office 3,259,941
Patented July 12, 1966

3,259,941
VERY HIGH PRESSURE APPARATUS
Kazuo Yasunami, Ashiya-shi, Japan, assignor to Kobe
Steel Works, Ltd., Kobe, Japan
Filed Jan. 6, 1965, Ser. No. 423,712
Claims priority, application Japan, Jan. 10, 1964,
39/792
6 Claims. (Cl. 18—16)

This invention relates to very high pressure apparatus usable in researches of the physical properties of different solids, the material formation through the phase transformation or change of the physical properties of the solids, and for other like purposes, and more particularly to apparatus of this sort for applying pressure to the faces of a polyhedron having at least two opposite parallel faces.

As is well known, high pressure can be produced in the material of an object by compressing it by piston means. In order to obtain very high pressure, the area of the pressure-applying surface of the piston, i.e., its front end surface directly contacting the object, should be fully reduced relative to the area of the pressure-receiving rear end surface of the piston thereby to obtain on the pressure-applying surface a satisfactorily large force, which is proportional to the area ratio. Already known is the procedure of compressing an object in which according to the above principle a piston having a pressure-applying front end surface reduced in area is employed. In such procedure of compressing an object, two or more pistons are used in combination since the most part of the pressure applied is transmitted only in the direction in which the pressure is applied.

Previously, two classes of apparatus have been developed to produce in a solid material a very high pressure, for example, of 100,000 atmospheres or over. In one class, a solid object is compressed by applying pistons onto two parallel faces of the object while restraining the latter about its periphery. Included in this class are the "Belt" apparatus developed by the General Electric Company of the United States and disclosed in the Japanese patent publication No. 2346 of 1961 under the title of High Temperature High Pressure Apparatus and the piston-cylinder apparatus invented by Professor Drickamer of the Illinois University of the United States. The other class, in which pressure is applied to each face of a polyhedral object, includes the tetrahedral anvil apparatus developed by Professor Hall of the Brigham Young University of the United States; the N.B.S. unit, a simplification of the Hall apparatus (in each of the above an anvil is employed to press against each face of a tetrahedron); the apparatus developed by the Engineering Supervision Company of the United States, an improvement over the preceding two forms, and disclosed for example in the Japanese patent publication No. 1100 of 1962 under the title of Compression Apparatus; and the six-piston cube apparatus developed in the Soviet Russia, as defined in "Progress in Very High Pressure Research" by L. F. Vershchagin which is reported in the Proceedings of a conference at Bolton Landing, Lake George, New York, June 1960; John Wiley & Sons, New York, 1961, p. 297, Fig. 11. Of these polyhedral systems, generally two forms are in practical use; one form usable for applying very high pressure to solids which is tetrahedral having four equilateral triangular faces and the other form for cubic solids or hexahedrons. Whereas in the piston-cylinder type bilateral compression system a solid object is subjected to two pressures acting in opposite directions along one axis of the solid, the polyhedral compression system produces compressive forces or pressures to act upon the respective faces of a polyhedral solid and is thus characterized in that uniform pressures are obtainable in respective directions. Particularly, with the tetrahedral device, which necessitates specialized techniques and high accuracy in fabrication of the device to arrange the four pistons at definite solid angles to the respective reference planes, the pistons are subjected to different loads or reactional forces when driven radially inwardly because of the difficulty to cause the respective axis of the pistons to intersect one another at a point forming the working center of the device. Such nonuniform loading of the pistons frequently results in breakage thereof. The breakage of the pistons means a heavy economical loss as they are made of a costly hard material to serve the purpose of producing very high pressure. Though the hexahedral system is free of such deficiency, any previous very high pressure apparatus of this system involves a fatal deficiency that it is impossible to drive the six pistons all at the same rate of stroke. The six pistons are fitted in respective cylinders to be actuated hydraulically and cannot maintain the same amount of compression stroke even though they are driven under high pressure independently from each other. The object to be compressed is usually limited in size and subjected only to limited compression strokes of the pistons, therefore any nonuniformity in the piston strokes forms a fatal deficiency of the device.

In hydraulically driving the pistons against the respective faces of the object to be compressed, proposals have been made to employ an appropriate electrical or electronic device to synchronize the stroke motion of the pistons. Though, such device is highly effective in synchronization of this sort of piston device involving a very limited stroke motion, use of such synchronizing device makes the entire structure of the pressure apparatus very complicated and hence highly expensive.

For a better understanding of the invention, reference is made to the following description and to the accompanying drawings, in which:

FIG. 1 is a perspective view illustrating the principles of the hexahedral compression system for producing very high pressure;

FIGS. 2 and 3 diagrammatically illustrate the production of very high pressure according to the polyhedral compression system;

FIG. 4 is a front cross-sectional elevation of a very high pressure apparatus embodying the present invention;

FIG. 6 is a perspective view of the apparatus with parts removed;

FIG. 7 is a front elevation of the entire press apparatus; and

FIGS. 8 and 9 are diagrammatic views illustrating the principles of the present invention.

Figure 5:
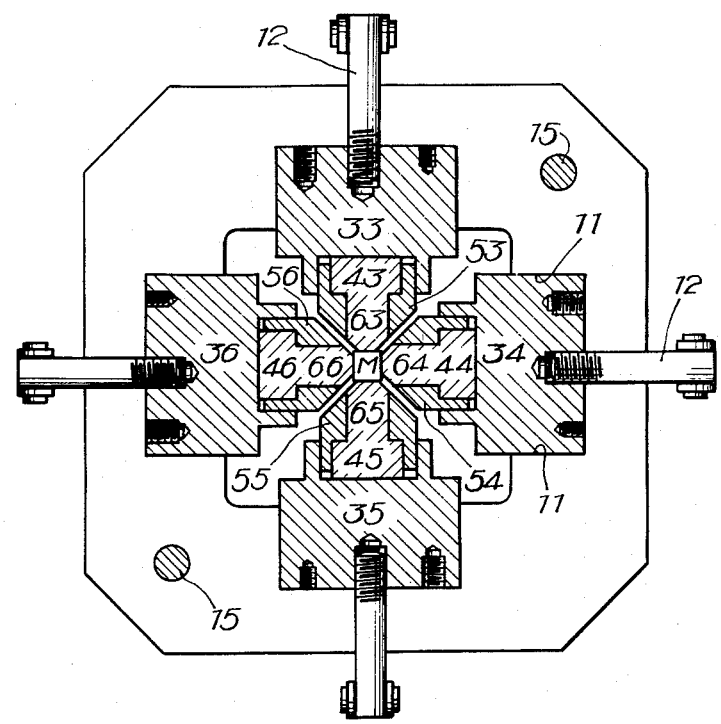
FIG. 5 is a transverse cross section of the embodiment taken through its medial portion.

It has been found, that to synchronize the pistons by purely mechanical means is highly advantageous compared to the synchronization by electrical or electronic means. Mechanical synchronization can be realized, for example, according to the invention disclosed in the Japanese patent application No. 1100 of 1962, referred to hereinbefore. The principle of the polyhedral compression system of the published invention will next be described with reference to FIG. 2. In order to apply pressure to a solid object M, at least one piston, or anvil I as called in the publication, is driven under the press force F against the solid object M so that the latter is pushed downwardly, as viewed in FIG. 2, into pressure contact with the forward ends of the other pistons II and III, which are thus caused to contact with piston I through the medium of the contacting surfaces. On this occasion, it will be noted that some slippage takes place between the contacting surfaces of the pistons II and III and the adjacent surfaces of the solid object M, the driving against the latter of pistons I being thus translated into wedging actions against the object by pistons II and III. In this manner, component forces $F_1$ and $F_2$ of the press force F act axially of the pistons II and III, respectively, and the reactional forces $F_1'$ and $F_2'$ from the pistons II and III, held in contact with supports S, act upon the solid object M. At this point, it will be noted that the solid object M is compressed for the first time on all its faces.

On the other hand, the polyhedral system can utilize no infinite compression stroke in producing very high pressure in a solid object unlike the bilateral system in which two aligned pistons are driven toward each other against a solid object to produce high pressure therein. Referring again to FIG. 2 and also to FIG. 3, the pistons II and III ach act in a direction at an angle to the direction in which the piston I acts and will finally come into contact with piston I, for example, at parts $a$. Thereafter, none of the pistons can proceed any further and this forms finiteness of their compression stroke. Under these circumstances, it will be readily understood that any very high pressure cannot be produced unless the spaces $b$ between the adjacent pistons I-II, II-III and III-I are sealed completely. To solve this problem, a body of material such as pyrophillite is employed to enclose the material to be compressed. This composite body is placed as a solid object M in the center of the piston arrangement and, when the body is compressed, the peripheral portion of the pyrophillite body is extruded into the spaces $b$, to serve as gaskets $c$ between the adjacent pistons, as shown in FIG. 3, and thus enables production of a desired very high pressure in the solid material.

It will be understood that the spaces $b$ between the adjacent pistons are required to have the same magnitude D (FIG. 3). If one of the spaces $b$ be larger than the remaining spaces, the amount of gasket forming material extruded into the space would naturally be larger than that extruded into any of the other spaces $b$, making it difficult to produce any very high pressure in the solid material. On the other hand, in the region of any smaller space a locally excessive pressure may possibly be produced to cause unwanted bending and shearing stresses in the adjacent pistons. This not only makes it impossible to produce desired very high pressure but also may result in breakage of the pistons. Therefore, in performing the polyherdal compression, it is critically important that all of the pistons have the same compression stroke. In other words, the poyhedral space defined by the forward ends of the advancing pistons must be regularly shaped. This is the reason why the pistons are required to advance in synchronism.

However, this requirement cannot be satisfied in the system of FIG. 2, in which the press force F applied to one of the pistons I is first transmitted to the solid object M and then its component forces $F_1$ and $F_2$ are transmitted to the other pistons II and III so that these pistons are advanced reactionally. The reason for this is that the solid material M scarcely exhibits any perfect homogeneity or isotropy, its density, hardness and other physical properties being different in different directions in the material. Transmission of the press force through such solid material involves initial compression starting in a region where the resistance to compression is the least and the advance of the piston opposing such region is retarded relative to the other pistons so that any desired high pressure is hardly obtainable.

With the polyhedral system, it is desirable to meet the following condition in addition to the above requisite that all the pistons should be advanced in synchronism to maintain the regular shape of the compression space defined by the pistons. The additional condition is that in operation of the piston they are not subjected to any moment. If any moment be applied to the piston, it causes some tensile bending stress in the piston material and may result in breakage of the piston since its material is high only in compressive strength and low in tenacity and particularly the pressure-applying portion of the piston is made of a super-hard material. This second condition can be met with the polyhedral system such as shown in FIG. 2. Referring to FIG. 2, when the press force F is applied through piston I to the solid material M to displace the latter downwardly, the other pistons II and III also tend to be displaced downwardly causing upward frictional forces $f$ between the rear faces of the pistons II and III and respective supports S therefor. As will readily be understood, the downwardly acting press force F and the upward frictional forces $f$ together from turning moments acting upon the respective pistons II and III as indicated by the arrows A. The moments apparently produce a tensile bending stress in the respective pistons. This is a deficiency inherent to the system.

In an attempt to alleviate this deficiency of the polyhedral system of FIG. 2, it has been proposed to increase the inclination of the contacting surfaces $d$ of the pistons II, III and supports S by an angle of from 0.5° to 1.0° beyond the theoretical angle of inclination of the pistons. Though, by doing this, the deficiency due to friction may be reduced to some extent or other, such variation in inclination of the bearing surfaces $d$ from the theoretical angle is undesirable since the above-described requirement to maintain the regular configuration of the compression space can no longer be met.

To summarize, the polyhedral compression system of FIG. 2 is inherently deficient in that it cannot concurrently satisfy the two practical requirements that the compression space must maintain its regular configuration and that the pistons should not be subjected to any moment.

The present invention relates to polyhedral compression systems and particularly to those for compressing hexahedral and other polyhedral objects having at least two parallel faces and has for its object to provide a very high pressure apparatus which is free of the above-noted deficiencies satisfying both of the two requirements discussed hereinbefore. As will be described below in detail, the apparatus of the invention is of the novel type differing in character from the system shown in FIG. 2, which includes a synchronizing device disclosed in the Japanese patent publication No. 1100 of 1962 referred to hereinbefore and in which the driving force is transmitted through the medium of the object to be compressed, and also from the system in which the object to be compressed is mounted aslant for transmission of the press force. The important feature of the present invention is that the driving force is transmitted directly to all the pistons but not by way of the object to be compressed and thus applied to the latter through all of the pistons in a simultaneous fashion.

According to the present invention, a pair of opposing pistons 61 and 62 are arranged in vertical alignment with each other, as shown in FIG. 1, and, when driven vertically toward each other, are pressed against the top and bottom faces of the object to produce high pressure therein in a vertical direction.

Arranged at right angles to the vertical driving direction of the two pistons 61 and 62, that is, in a horizontal plane are three, four or more pistons 63, 64, 65 and 66 which are adapted to be driven along respective horizontal lines extending through the center of the object M to be compressed. Radially inward movement of the group of pistons 63–66 arranged in a horizontal plane gives rise to horizontal pressures directly acting upon the peripheral side of the solid material M. According to the important feature of the present invention the driving forces of the radially arranged pistons 63–66 are given rise to by the driving forces of the pair of vertically aligned pistons 61 and 62. In order to transmit the inward driving forces acting upon the pair of vertically aligned pistons 61 and 62 to the horizontal pistons 63–66, there are formed between the two groups of pistons power transmitting surfaces which extend at an angle of 45° to the direction in which the pair of vertically aligned pistons 61 and 62 are driven. In this manner, the vertical driving forces applied to the vertically aligned pistons are converted through the power transmitting surfaces into horizontal forces, which drive the horizontal pistons 63–66 radially inwardly. Accordingly, the vertical forces applied by the pair of vertically aligned pistons 61 and 62 to the object M to be compressed are equal to the forces applied horizontally to the object M by the horizontal pistons 63–66 in magnitude measured on the respective pressure-receiving surfaces of the object. In other words, with this arrangement, the object M is compressed uniformly about its entire surface and equal pressures (see FIGS. 8 and 9). As will readily be recognized, the object being compressed does not form any portion of the path along which the driving forces are transmitted. In this connection, the power transmitting surfaces inclined at an angle of 45° serve to secure the synchronism with which the vertically aligned pistons on one hand and the horizontally arranged ones on the other hand are advanced simultaneously by the same stroke amount. On this occasion, the frictional forces occurring along the 45°-inclined power transmitting surfaces, which are arranged symmetrically with respect to a horizontal plane, counteract each other and the pistons are thus subjected only to compressive forces but not to any bending moment. It will be apparent, therefore, that the above arrangement is highly effective as a mechanical synchronizing means.

According to the present invention, very high pressure can be obtained in a simple manner since the plurality of pistons are actuated simultaneously by the same stroke amount. As apparent from FIGS. 8 and 9, the synchronized advancing movement of the vertically aligned pistons 61 and 62 on one hand and the horizontally arranged pistons 63 to 66 on the other hand ensures that the spaces $b$ between the adjacent pistons are uniformly reduced in magnitude (D) so that the edge portions of the object M being compressed are extruded in the same amount into the respective spaces $b$ to form gaskets $c$, which enables production of a very high pressure in the solid material M and that with efficiency and extreme ease. In addition, the compression process is not affected at all by any nonuniformity of the solid material, ensuring the regular configuration of the compression space as defined by the pistons. Further, there is no danger that the pistons be broken under tensile bending stress since they are not subjected to any moment but only to axial external forces.

According to the present invention, it will be appreciated from the foregoing description that very high pressure can be obtained by a simple procedure employing a simple installation, which satisfies both of the aforesaid conditions required of the polyhedral compression system.

Referring next to FIG. 4, the embodiment illustrated therein employs a pair of upper and lower bolsters 1 and 2, which are mounted between the pressure plates of a press as shown in FIG. 7 and in which are embedded respective thrust blocks 31 and 32 in axial alignment with each other. Pistons 61 and 62 having respective integral bases 41 and 42 are fixedly mounted on the thrust blocks 31 and 32 through the intermediary of respective bearing rings 51 and 52. As shown in FIG. 4, the two pistons 61 and 62 are thus arranged opposite to each other in vertical alignment. Arranged crosswise between the upper and lower bolsters 1 and 2 are not less than three, for example, four of thrust blocks 33, 34, 35 and 36, as shown in FIG. 5. As with the cases of thrust blocks 31 and 32, pistons 63, 64, 65 and 66 having respective integral bases 43, 44, 45 and 46 are fixedly mounted on the four thrust blocks 33–36 through the intermediary of respective bearing rings 53, 54, 55 and 56. The four pistons 63 to 66 are arranged radially with respect to the vertical axis of the apparatus, as shown.

The four thrust blocks 33 to 36 arranged in the same horizontal plane, are each formed with an upper and a lower surface 7 and 8 inclined at an angle of 45° to the vertical axis of the apparatus, as shown in FIG. 4. The inclined surface are in sliding engagement with respective complementary surfaces 9 and 10, which are formed on the opposing surfaces of the upper and lower bolsters 1 and 2 at the same angle of inclination of 45° to serve as power transmitting surfaces. The bolsters 1 and 2 are each formed with parallel guide faces 11 on the opposite sides of the inclined surfaces 9 or 10 (see FIG. 5). The thrust blocks 33–36 are fitted between the guide faces 11 for radial displacement.

To hold the four horizontally arranged thrust blocks 33 to 36 in place, for example support rods 12 are secured to the respective blocks and extend outwardly therefrom to be pivoted as at 14 to respective appropriate lever arms 13.

With this arrangement, since the upper bolster 1 is apparently placed above the lower one 2 with the four horizontally arranged thrust blocks 33 to 36 interposed therebetween, the lowering of the upper bolster 1 with a relatively small hexahedral solid piece M of material placed on the lower piston 62 first causes the upper piston 61 to engage the top surface of the piece M while at the same time bringing the four radially arranged pistons 63–66 into contact with the four peripheral faces of the piece M (see FIGS. 4 and 5). In other words, as the upper bolster 1 is actuated to approach the lower bolster 2, they cooperate through the intermediary of their respective inclined surfaces 9 and 10 to displace the four thrust blocks 33 to 36 radially inwardly. That is, when the bolsters 1 and 2 are driven toward each other by hydraulic means such as indicated at 17 and 18 in FIG. 7, the driving forces are partly transmitted through the power transmitting surfaces 7, 8, 9 and 10 to the four thrust blocks 33 to 36 arranged radially in a horizontal plane to displace the blocks radially inwardly in the plane. On this occasion, since the power transmitting surfaces are inclined at the angle of 45° to the direction in which the bolsters 1 and 2 are driven, the advancing stroke of the two vertically aligned thrust blocks 31 and 32 is identical in magnitude and simultaneous with the advancing stroke of the other four thrust blocks arranged in one horizontal plane. In other words, all the six pistons 61 to 66 are moved at the same time radially inwardly toward a central point, applying the same pressure to the six faces of the solid object M to be compressed. In this manner, as the press apparatus is operated by mechanical or hydraulic means, a desired very high pressure is produced in the solid material enclosed by the six pistons.

With this apparatus, the synchronization of the movement of the two vertically arranged pistons 61 and 62 with that of the four horizontally arranged pistons 63–66 is effected through the power-transmitting surfaces 7, 8, 9 and 10, inclined at the angle of 45°, and such surfaces can be formed with extreme ease and with a minimum of working tolerance so that the six pistons 61 to 66 are synchronized in operation with high accuracy. It is highly advantageous that the six pistons are simultaneously advanced toward the central point by the same length of stroke as this continuously maintains the regular hexahedral configuration of the object being compressed and thus its six faces are always subjected to pressures equal to each other. Each of the pistons is usually chamfered at its forward or inner end at 90° intervals to form four chamfer surfaces 16 inclined at an angle of 45° to the vertical and the two parallel inclined surfaces 16 of any two adjoining pistons define a space therebetween, into which space a portion of the enclosure material covering the object to be compressed is forced to serve as a gasket therein. According to the present invention, since the pistons are advanced by the same stroke length in synchronism with each other, the spaces $b$ between the adjacent pistons are all decreased at the same rate and thus the enclosure material is forced into the spaces $b$ in amount equal to each other, as shown in FIG. 9. This apparently is highly effective to improve the efficiency with which high pressure is produced.

To summarize, the present invention is characterized in that the pistons are all advanced simultaneously while maintaining an accurate cubic space between the forward ends thereof by driving the two vertically aligned pistons toward each other, the driving forces being transmitted through the two sets of power-transmitting surfaces, inclined at 45° to the vertical in symmetrical relation to a horizontal plane to the other pistons arranged radially at right angles to each other in the horizontal plane thereby to drive them radially inwardly by the same stroke length as that of the vertically aligned pistons.

In practicing the present invention, it is preferably to secure vertical aligning pins 15 to one of the two bolsters 1 and 2, as shown in FIGS. 5 and 6, while forming vertical bores in the other bolster to receive the aligning pins. By this means, the two bolsters 1 and 2 can be displaced relative to each other under the guidance of the aligning pins while maintaining accurate vertical alignment.

It is also desirable to interpose sheets of Teflon or other electrically insulating material between the contacting inclined surfaces 7, 8 and 9, 10 formed on the bolsters 1, 2 and the thrust blocks 33 to 36 interposed therebetween. By this means, the upper and lower bolsters 1 and 2 can be electrically insulated from each other and from the interposed thrust blocks 33 to 36 lying in one horizontal plane while reducing the frictional resistance between the members sliding over each other. This arrangement is particularly advantageous in case the specimen is to be highly compressed under some electrical or thermal conditions. For example, electrical power supply terminals may be connected to the upper and lower bolsters 1 and 2 to produce a voltage across the two vertically aligned pistons 61 and 62 thereby to form Joule's heat in the object being compressed. Similarly, appropriate means may be provided to determine the electromagnetic change occurring in the object being compressed. Such electrical heating of the object and determination of the electromagnetic change therein can also be performed between the four pistons arranged in the same horizontal plane and electrically insulated from each other. Temperature measurement can also be performed by incorporation of thermo-couples. It will be appreciated with the above insulating arrangement, that the three procedures, including the electrical heating, electromagnetic measurement and temperature determination, can be performed at the same time by utilizing all of the six pistons.

Although one preferred embodiment of the present invention has been illustrated and described, it will be apparent to those skilled in the art that various changes and modifications can be made therein without departing from the spirit of the invention or from the scope of the appended claims.

What is claimed is:

1. An apparatus for producing very high pressure in an object and having a pair of aligned pistons adapted to be driven toward each other and not less than three pistons arranged in a plane perpendicular to the common axis of said aligned pistons and adapted to be driven toward the middle point between said aligned pistons, said apparatus comprising aligned opposite bolsters having said respective aligned pistons secured thereto with the other pistons radially arranged between said bolsters, and members supporting the respective radially arranged pistons on the outside thereof and each formed at its outer end with planar surfaces oppositely inclined at an angle of forty-five degrees to the direction in which said aligned pistons are driven, said bolsters being each formed with planar surfaces inwardly inclined at the same angle to make slidable face-to-face contact with the adjacent inclined planar surfaces of said respective members, said bolsters being also adapted to drive under press action said aligned pistons toward each other while at the same time driving said supporting members and hence said other pistons radially inwardly through the intermediary of said inclined planar surfaces formed on said bolsters and supporting members to serve as power-transmitting means therebetween.

2. A very high pressure press for producing pressures approaching 100,000 atmospheres comprising a pair of opposed die members, hydraulic means for relatively moving the die members on a line to and from each other, at least three die means mounted in a plane lying between the die members and at substantially right angles to said line, and cooperating flat inclined plane means on the die members at 45° angles to the line and the die means at 45° angles to the plane, which plane means engage for moving the die means synchronously towards each other the same distance in the plane when the die members are moved in synchronism towards each other the same distance on the line.

3. An apparatus designed to effect high pressure in some object to be tested, which includes the combination of
   a pair of aligned, opposite dies adapted to be driven toward each other,
   at least three similar dies arranged in a plane perpendicular to the common axis of said aligned dies,
   thrust block means supporting the similar dies in the plane and each formed at its outer end with planar surfaces oppositely inclined at angles of forty-five degrees to the direction in which said aligned dies are moved,
   a pair of aligned opposite bolsters having said pair of aligned dies secured thereto with the similar dies radially arranged between said bolsters, and means for driving said bolsters relatively toward and from each other, said bolsters being each formed with planar surfaces inwardly inclined at 45° angles to make complementary slidable face-to-face contact with the adjacent inclined surfaces of said thrust block means to drive said thrust block means and said similar pistons radially inwardly with movement of said bolsters towards each other.

4. A high pressure press for a work piece including a pair of platens movable relatively to and from each other, a bolster adapted to be secured to each platen, a thrust block centrally secured to each bolster, a piston having an enlarged base fixed to each thrust block so that the pistons oppose each other and the work piece, a bearing ring surrounding and supporting each piston but leaving the end thereof remote from the thrust block exposed, said end being of reduced area, a plurality of additional thrust blocks lying in a plane at right angles to the opposed pistons, means for supporting said additional thrust blocks in said plane, an additional enlarged base piston and bearing ring on each additional thrust block and having a reduced area end directed towards the work piece, a pair of oppositely inclined 45° planar surfaces on each additional thrust block at the end remote from the piston, complementary inclined 45° planar surfaces on the bolsters and engaging with the inclined 45° planar surfaces on the additional thrust blocks, and means for moving the platens towards each other to press all the pistons simultaneously with equal pressure and the same distance against a work piece.

5. In a high pressure apparatus the combination of three pairs of pistons, each pair aligned and adapted to be driven toward a common middle point to each pair, a pair of bolsters cooperating and aligned with one pair of pistons, with the other two pairs of pistons being arranged in a plane perpindicular to the common axis of the one pair of pistons and the bolsters, each bolster having four planes inclined at 45° to the direction of said each pair of pistons, and four thrust blocks to which are affixed each piston of said two pairs being arranged in a plane perpendicular to the common axis of the bolsters, said thrust blocks forming inclined planes at 45° angles for sliding engagement with said inclined planes of the pair of bolsters, thereby synchronizing movements of said three pairs of pistons the same distance toward the common middle point with high accuracy to transmit power equally to each piston.

6. In a high pressure apparatus the combination of three pairs of pistons, the pistons of each pair being aligned and being on a common axis adapted to be driven toward a common middle point to all pairs, a pair of opposed bolsters aligned with one said pair of pistons and being movable towards each other, one of each of said pair of pistons being carried by each of said bolsters, the other two pairs of pistons being in a plane perpendicular to the axis of the one said pair of pistons and the bolsters and having their axes perpendicular to each other, each bolster having four planar surfaces inclined at 45° to the plane of said other two pairs of pistons, and four thrust blocks to each of which is affixed one ipston of said two pairs of pistons and positioned in the plane of said pairs of pistons, said thrust blocks having surfaces forming planes inclined at 45° angles to said plane of said pair of pistons for sliding engagement with said planar surfaces of the pair of bolsters, thereby synchronizing movements of said three pairs of pistons the same distance toward the common middle point with high accuracy to transmit power equally to each piston as said bolsters are moved towards each other.

References Cited by the Examiner

UNITED STATES PATENTS

| | | |
|---|---|---|
| 3,093,862 | 6/1963 | Gerard et al. |
| 3,100,912 | 8/1963 | Lloyd et al. |
| 3,134,139 | 5/1964 | Wentorf. |
| 3,154,619 | 10/1964 | Brayman et al. |
| 3,169,273 | 2/1965 | Brayman. |

WILLIAM J. STEPHENSON, *Primary Examiner.*